F. H. JENKINS.
COMBINATION LUNCH BOX.
APPLICATION FILED AUG. 10, 1920.
1,411,032.
Patented Mar. 28, 1922.
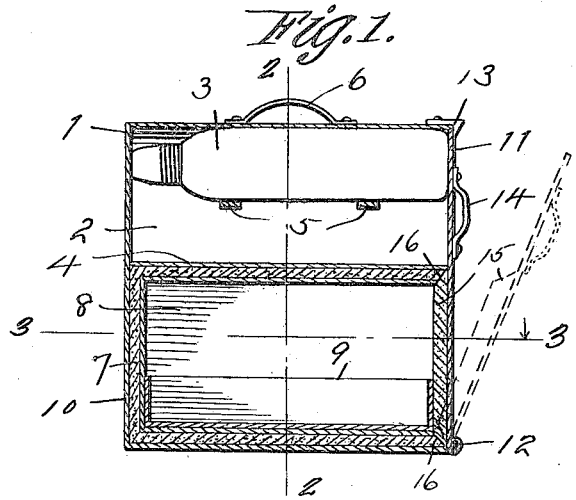
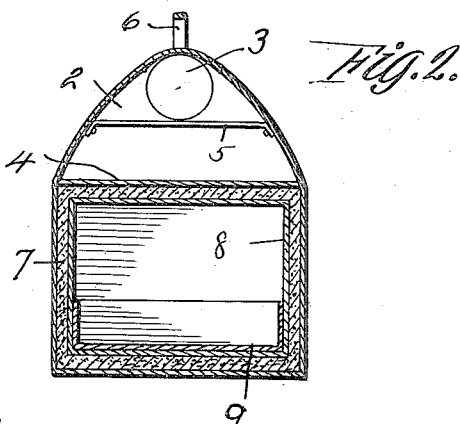
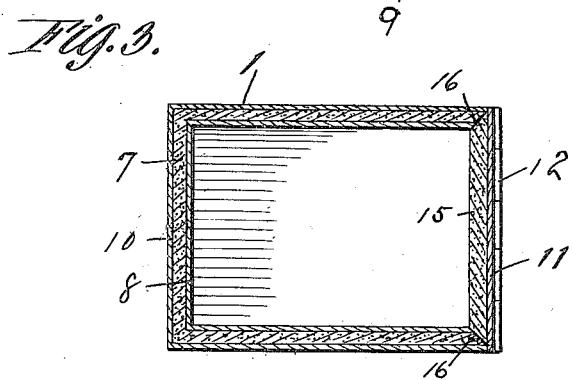
WITNESSES
Guy M. Spring
Frank D. O'Connell
Frank H. Jenkins INVENTOR.
BY
Richard B. Owen
ATTORNEY.

UNITED STATES PATENT OFFICE.

FRANK H. JENKINS, OF GEORGETOWN, ILLINOIS.

COMBINATION LUNCH BOX.

1,411,032.

Specification of Letters Patent.

Patented Mar. 28, 1922.

Application filed August 10, 1920. Serial No. 402,563.

*To all whom it may concern:*

Be it known that I, FRANK H. JENKINS, a citizen of the United States, residing at Georgetown, in the county of Vermilion and State of Illinois, have invented certain new and useful Improvements in Combination Lunch Boxes, of which the following is a specification.

The present invention has reference to boxes for carrying lunches and has for its primary object to provide a device of this character so constructed as to prevent the escape of any of the heat or warmth emanating from its contents, thereby keeping the same warm or hot for a considerable period.

A further object is to provide means in which food and drink containing elements may be conveniently inserted and retained in their originally warmed state and at the same time be readily moved from place to place.

With the above and other objects in view, the invention resides in the details of construction, combination and arrangement of parts as will be hereinafter more fully pointed out, reference being had to the accompanying drawings, wherein—

Figure 1 is a vertical cross sectional view of a lunch carrier constructed in accordance with the invention.

Figure 2 is a vertical cross section taken on the line 2—2 of Figure 1, and

Figure 3 is a horizontal section taken on the line 3—3 of Figure 1.

The invention is preferably constructed of light metal, although it is obvious that it may be constructed of other suitable material, and comprises a boxing 1 of rectangular cross section as shown to advantage in Figure 2 of the drawings. The opposite side walls of the casing are extended upwardly in arched formation above the top of the boxing to provide a dome shaped compartment 2, or hood-top for the box for the reception therein of beverage containers, such as indicated at 3. The beverage containers would preferably be in the form of vacuum bottles and would be supported within the dome shaped compartment either upon the top wall 4 of the casing or by being laid upon the cross braces 5 extending across from one side of the compartment to the other and fastened to the side walls thereof. The box is provided with a carrying handle or grip 6 by means of which it can be readily carried about.

The casing 1 is lined upon the inside with either cardboard or any other suitable packing 7 which is arranged up against the inner wall spaces of the casing so as to provide a bed for the inner container or box receptacle 8. This box container is preferably rectangular in cross section so as to conform to the shape of the casing and is opened at one end only. When inserted in the container, it is snugly embraced and covered by the packing which acts as a heat retainer for preventing any heat from escaping out through the wall of the inner container. Slidably fitted within the container is a lunch tray 9 which is designed to receive the luncheon or food contents to be arranged within the casing. One end of the casing is permanently walled up as indicated at 10 the wall enclosing both the rectangular portion of the casing and the upper dome compartment 2. At its other end, however, the casing is provided with a door 11 hinged at the bottom edge of the casing as at 12 and having its upper end engageable by a latch 13 carried by the roof of the dome compartment. The door is also provided with a handle 14 so that it will be easily swung to an open or shut position. Arranged upon the inner face of the rectangular portion of the door is a block or stopper 15 of cork, beveled along the edges and shaped to fit snugly within the seat formed by the corresponding beveled edges 16 at the open end of the casing. When the door is shut, the cork or stopper 15 effectively seals the opened end of the inner container 8 and makes it air tight so that the heat and warmth emanating from the contents of the tray are confined to the enclosed space, the packing 7 preventing it from escaping to the exterior through the metal walls of the casing. Upon manually lifting the latch 13, the door can be swung back and access readily had to the lunch tray and beverage container. The dome shaped compartment provides a place where articles may be carried in either a hot or cold state without affecting to any degree the condition of the contents deposited within the container, the intervening packing 7 providing a partition barrier which prevents the transmission of either heat or cold thus enabling the contents to be preserved in their original state for an indefinite period.

It is apparent that minor changes in the details of construction, combination and arrangement of parts may be desirable in the practical application of the invention and it is therefore to be understood that the device is not to be considered as limited to the construction as set forth and described above, but that it is subject to such alterations and corrections as properly fall within the scope of the invention as defined in the appended claims.

Having thus described the invention what I claim as new and desire to secure by Letters Patent is:—

1. A lunch box of the class described comprising a casing having an insulated food receiving compartment and a beverage container compartment, said casing being closed at one end, and open at its opposite end, a hinged door or closure for said open end of the casing, an insulated stopper secured to a portion of the inner side of said closure for sealing the open end of the food compartment when the door is closed and means for locking said closure.

2. A lunch box comprising a casing having an insulated food receiving compartment and a beverage container compartment, cross braces reenforcing the sides of said last mentioned compartment and adapted to support a container, said casing being closed at one end and open at its opposite end, a hinged door for said closed end, and insulated means on the inner face of said door for sealing the open end of the food compartment when the door is closed.

In testimony whereof I affix my signature in presence of two witnesses.

FRANK H. JENKINS.

Witnesses:
WM. T. WHITE,
C. B. MARTIN.